(12) United States Patent
Zhang et al.

(10) Patent No.: US 8,355,543 B2
(45) Date of Patent: Jan. 15, 2013

(54) METHOD AND SYSTEM FOR IDENTIFYING A PERSON BASED ON THEIR TONGUE

(75) Inventors: David Zhang, Hong Kong (HK); Zhi Liu, Hong Kong (HK)

(73) Assignee: The Hong Kong Polytechnic University, Kowloon (HK)

( * ) Notice: Subject to any disclaimer, the term of this patent is extended or adjusted under 35 U.S.C. 154(b) by 908 days.

(21) Appl. No.: 12/131,384

(22) Filed: Jun. 2, 2008

(65) Prior Publication Data

US 2009/0296994 A1 Dec. 3, 2009

(51) Int. Cl.
*G06K 9/00* (2006.01)
(52) U.S. Cl. ...................................................... 382/115
(58) Field of Classification Search ................... None
See application file for complete search history.

(56) References Cited

U.S. PATENT DOCUMENTS

| | | | | |
|---|---|---|---|---|
| 6,785,406 B1* | 8/2004 | Kamada | ..................... | 382/117 |
| 6,816,836 B2* | 11/2004 | Basu et al. | .................... | 704/270 |
| 7,130,446 B2* | 10/2006 | Rui et al. | ..................... | 382/103 |
| 7,657,083 B2* | 2/2010 | Parr et al. | ..................... | 382/155 |
| 7,764,815 B2* | 7/2010 | Kim et al. | ..................... | 382/128 |
| 2006/0078172 A1* | 4/2006 | Zhang et al. | .................. | 382/118 |
| 2007/0250924 A1* | 10/2007 | Ono et al. | ....................... | 726/19 |

OTHER PUBLICATIONS

Lee et al., "Reliable On-Line Human Signature Verification Systems", IEEE Transactions on Pattern Analysis and Machine Intelligence, Jun. 1996, vol. 18, No. 6, pp. 643-647.

Wang et al., "Silhouette Analysis-Based Gait Recognition for Human Identification", IEEE Transactions on Pattern Analysis and Machine Intelligence, Dec. 2003, vol. 25, No. 12, pp. 1505-1518.
O'Gorman, "Comparing Passwords, Tokens, and Biometrics for User Authentication", Proceedings of the IEEE, Dec. 2003, vol. 91, No. 12, pp. 2019-2020.
Jain et al., "Biometrics: A Grand Challenge", Proceedings of the 17th International Conference on Pattern Recognition (ICPR), 2004, vol. 2, pp. 935-942.
Kollreider et al., "Evaluating Liveness by Face Images and the Structure Tensor", Proceedings of the Fourth IEEE Workshop on Automatic Identification Advanced Technologies, 2005, pp. 75-80.
Moon et al., "Wavelet based fingerprint liveness detection", Electronics Letters, Sep. 29, 2005, vol. 41, No. 20, pp. 1112-1113.
Abate et al., "2D and 3D face recognition: A survey", Pattern Recognition Letters, 2007, vol. 28, pp. 1885-1906.
Bowyer et al., "Image Understanding for Iris Biometrics: A Survey", Computer Vision and Image Understanding, 2007, 38 pages.
Ratha et al., "A Real-Time Matching System for Large Fingerprint Databases" IEEE Transactions on Pattern Analysis and Machine Intelligence, Aug. 1996, vol. 18, No. 8, pp. 799-813.
Sandström et al, "Liveness Detection in Fingerprint Recognition Systems", thesis of Department of Electrical Engineering: Linköping University, 2004, 149 pages.
Zhang et al., "Online Palmprint Identification", IEEE Transactions on Pattern Analysis and Machine Intelligence, Sep. 2003, vol. 25, No. 9, pp. 1041-1050.

(Continued)

*Primary Examiner* — Amir Alavi
*Assistant Examiner* — Kenny Cese
(74) *Attorney, Agent, or Firm* — Kauth, Pomeroy, Peck & Bailey LLP

(57) ABSTRACT

A method for identifying a person based on their tongue is provided in which an image of a tongue of a person is compared to recorded details of tongues in a database. If a match is found, the person is identified.

10 Claims, 7 Drawing Sheets

OTHER PUBLICATIONS

Tistarelli et al., "Dynamic face recognition: From human to machine vision", Image and Vision Computing, 2007, pp. 1-11.

Wan et al., "Speaker Verification Using Sequence Discriminant Support Vector Machines", IEEE Transactions on Speech and Audio Processing, Mar. 2005, vol. 13, No. 2, pp. 203-210.

Sanchez-Reillo et al., "Short Papers—Biometric Identification Through Hand Geometry Measurements", IEEE Transactions on Pattern Analysis and Machine Intelligence, Oct. 2000, vol. 22, No. 10, pp. 1168-1171.

* cited by examiner

METHOD AND SYSTEM FOR IDENTIFYING A PERSON BASED ON THEIR TONGUE

TECHNICAL FIELD

The present invention generally relates to biometrics and in particular a method and system for identifying a person based on their tongue.

BACKGROUND OF THE INVENTION

Biometrics have a number of advantages over security measures which use tokens such as physical keys, and those which are knowledge-based such as password protection. Biometric features cannot be easily stolen, lost, guessed, forgotten, or duplicated. The list of physiological and behavioral biometric characteristics that have so far been developed and implemented is extensive including the face, iris, fingerprint, palm print, hand shape, voice, written signature and gait. These biometrics have drawbacks. For example, fingerprint and palm print are usually frayed; voice, signatures, hand shape and iris images are easily forged; face recognition can be made difficult by occlusions or if the person has undergone a face-lift. Various experiments have shown that biometrics such as fingerprint, iris and face recognition are susceptible to spoofing attacks, that is, the biometric features are copied and used to create artifacts that deceives many biometric devices.

All authentication systems based on biometrics are flawed if they cannot distinguish between a photograph and the live presence of a person. Therefore, a technique of detecting liveness should be done to ensure that input biometric features are not collected from an inanimate object. The aim of liveness detection (or vitality detection as it is sometimes known) is to determine if the biometric data is captured from a legitimate living user physically present before a biometric data acquisition device. Various liveness detection methods have been implemented, for example, perspiration is used for proof of liveness of a fingerprint and iris shrink is used for verifying liveness of an iris. However, these liveness detection methods require complex hardware, or can be easily defeated.

Accordingly, there is a desire for an authentication system and method that ensures that sensed measurements for verifying the identity of a person are not fraudulent.

SUMMARY OF THE INVENTION

In a first aspect, there is provided a method for identifying a person based on their tongue, the method comprising:
  comparing an image of a tongue of a person to recorded details of tongues in a database;
  wherein if a match is found, the person is identified.

The method may further comprise: comparing a series of images of the tongue of the person to detect whether the person is alive.

An involuntary squirm of the tongue to detect whether the person is alive may be determined by capturing the images from a front view of the tongue protruding from the mouth and naturally spread.

An active retractile action of the tongue to detect whether the person is alive may be determined by capturing the images of the tongue while it is being protruded from the mouth.

The method may further comprise the initial steps of:
  capturing the image of the tongue; and
  processing the captured image to detect predetermined physiological features of the tongue.

The recorded details of tongues in the database may be a plurality of reference sets of physiological features of tongues, and the detected physiological features are compared the reference sets to verify the identity of the person.

The predetermined physiological features of the tongue may include: geometric features of the tongue, linear features on the top surface of the tongue, and texture of the top surface of the tongue.

The geometric features of the tongue may be detected from a set of control points, the control points including corners of the mouth and tip of the tongue.

In a second aspect, there is provided a method for recording details of tongues in a database for identifying people, the method comprising:
  extracting static features of a tongue from an image of a tongue of the person;
  extracting dynamic features of the tongue from a series of images of the tongue of the person; and
  storing the extracted features in a template.

The method may further comprise:
  collecting measurement vectors from the extracted dynamic features;
  determining a mean value $\mu$ and covariance matrix $\Sigma$ of the measurement vectors.

In a third aspect, there is provided a method for detecting whether a subject presented to a biometric system is a living person, the method comprising:
  capturing a series of images of a tongue of the subject; and
  detecting movement of the tongue from the captured images to determine whether an instinctive squirm of the tongue has occurred to indicate that the subject is a living person.

In a fourth aspect, there is provided a system for identifying a person based on their tongue, the system comprising:
  a database to store static features of tongues of people;
  an image capture device to capture an image of a tongue of a person; and
  a recognition module to extract static features of the tongue from the captured image and to compare the captured image to the static features stored in the database;
  wherein if a match is found in the database, the person is identified.

The system may further comprise:
  an enrollment module to collect measurement vectors from a person in order to learn the parameters for comparison and verifying the identity of people;
  wherein the parameters include a mean value $\mu$ and covariance matrix $\Sigma$ of the measurement vectors.

In contrast to the prior art, the present invention provides:
  1. The use of a human tongue as a biometric identifier for identifying a person.
  2. The instinctive squirm of a tongue is used for liveness detection in biometrics.
  3. The static features and the dynamic features are both used for identifying a person.

The advantages of using a tongue as a biometric identifier are that:
  1. The human tongue is protected from the external environment by being generally protected in the mouth. This is in contrast to fingerprints or palm prints that may be easily damaged;
  2. The instinctive squirm of a human tongue constitutes a very powerful dynamic signature which augments the information stored for an individual and may dramatically improve the ability to prevent forgery for determining identity; and 3. The visual features of a tongue cannot be reverse engineered.

BRIEF DESCRIPTION OF THE DRAWINGS

An example of the invention will now be described with reference to the accompanying drawings, in which.

DETAILED DESCRIPTION OF THE DRAWINGS

Figure 1:
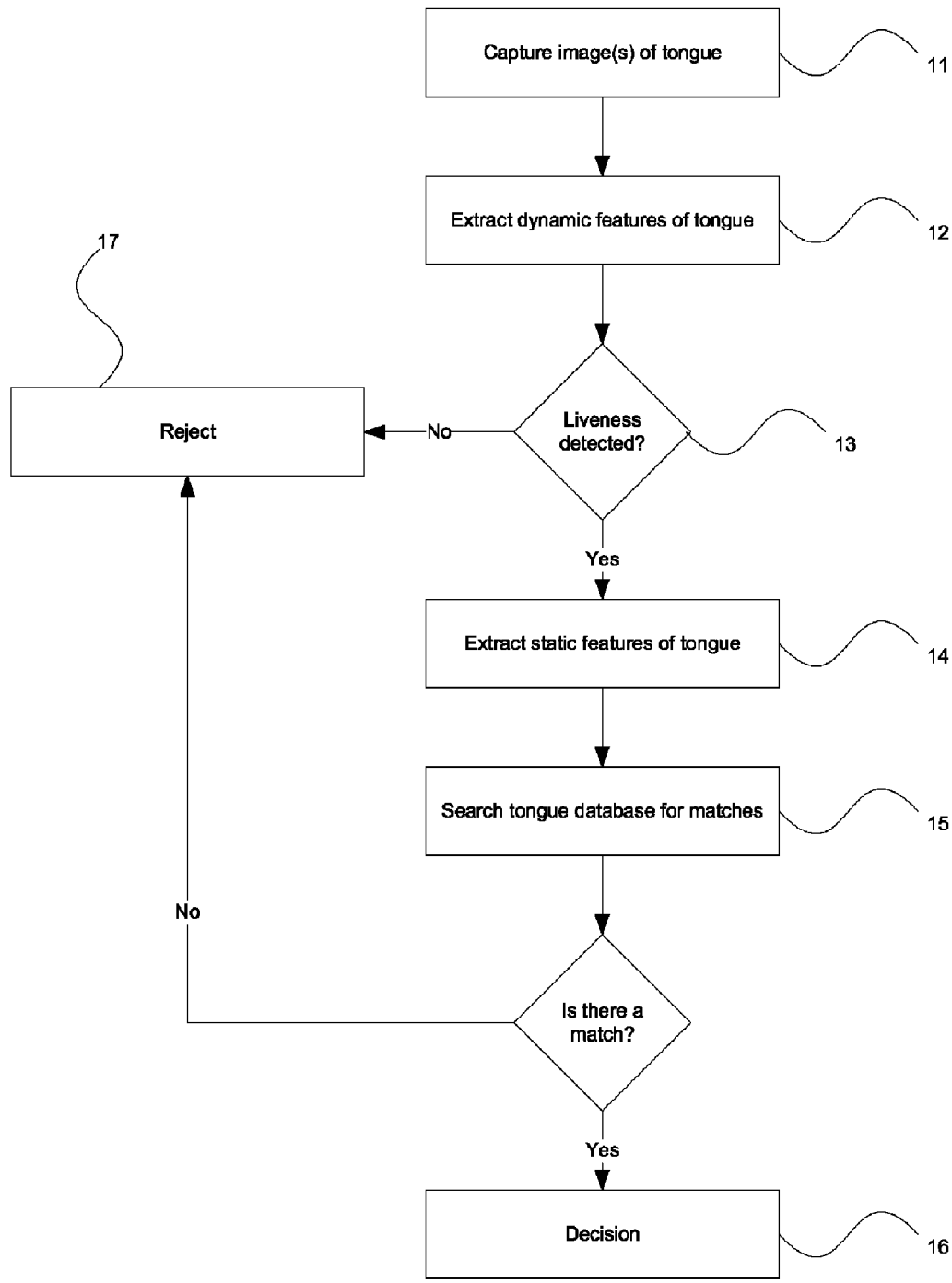
FIG. 1 is a process flow diagram of a method for identifying a person based on their tongue in accordance with an embodiment of the present invention.
Figure 2:
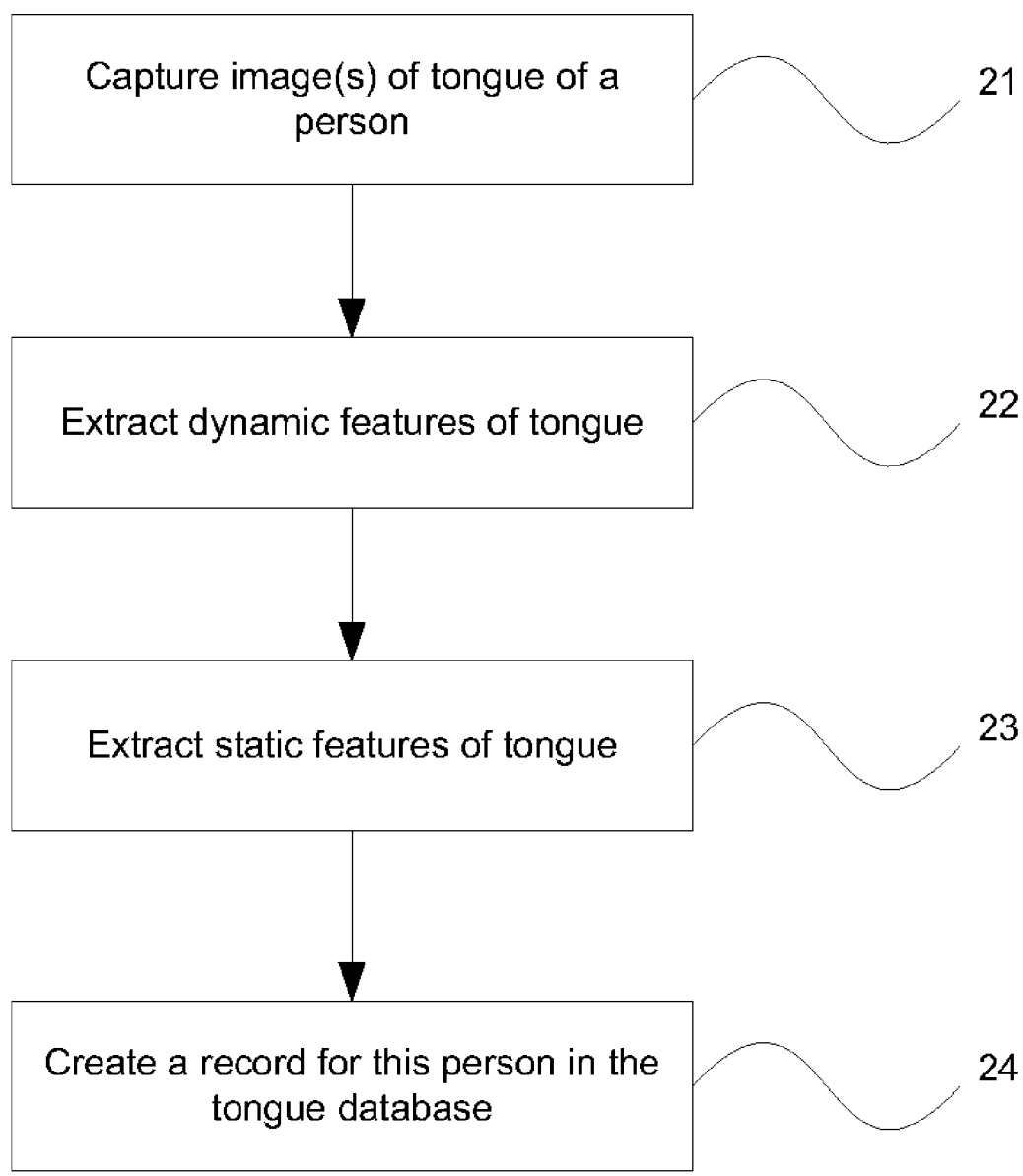
FIG. 2 is a process flow diagram of a method for recording the details of a tongue of a person for subsequent identification in accordance with an embodiment of the present invention.
Figure 12:
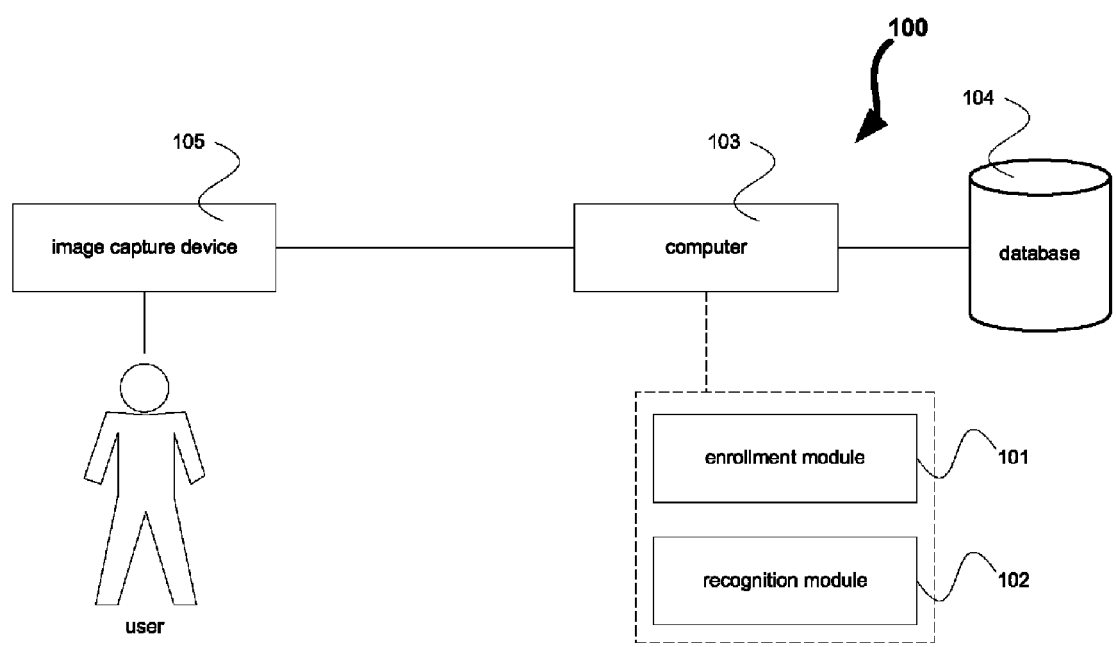
FIG. 12 is a block diagram of a system for identifying a person based on their tongue in accordance with an embodiment of the present invention.

Referring to FIGS. 1, 2 and 12, a biometric identification system 100 using a human tongue is used as a biometric identifier is provided. The system 100 has two main modules: enrollment 101 and recognition 102. The modules 101, 102 are provided in software installed on a computer 103. The computer 103 is connected to a database 104 which stores details of tongues for identifying people. The computer 103 is also connected to an image capture device 105 capable of capturing multiple digital images of a tongue.

Turning to FIG. 1, a method for identifying a person based on their tongue is performed by the recognition module 102 which has two process phases. The first phase is liveness detection to detect a living person according to the dynamic information of the tongue squirm and the second phase is to extract both the physiological features (static features) of the tongue and the features of the tongue squirm (dynamic features). Dynamic features refer to the instinctive squirm features of the tongue.

Images of the tongue are captured (11) by a camera or other kind of image capturing device 105. The tongue is the only internal organ that can easily be exposed for inspection. It is the exposed portion of the tongue that carries a large amount of physiological information (static features) including geometric features (width, curvature, length and thickness), linear features 51 on the top surface of the tongue (hereinafter referred to as crack features) and texture features. The different texture of tongue surface can be classified as exquisite, coarse, speckled and nubby. The static features of a human tongue are stable. Since the human tongue is contained in the mouth, it is protected from the external environment unlike, for example fingers that may be easily damaged over the course of a person's life. The instinctive squirm of the human tongue is a dynamic feature of the tongue which is a natural and convincing proof that a subject is alive and can be used for recognition. The static features and dynamic features of the tongue are extracted and both used for identity recognition.

The features of tongue squirm are extracted (12) based on the captured image sequence. A qualitative analysis is performed for liveness detection and a quantitative analysis is performed for identification purposes. Using the tongue squirm for liveness detection has several advantages. The tongue squirm is intrinsic and more acceptable for use in contrast to the iris shrink of an eye by an external illumination stimulus. The tongue squirm is involuntary and random and is so slight that it does not affect the overall shape of the tongue during image capture. Using these dynamic features of the tongue, a liveness detection can be implemented by software rather than requiring additional hardware. The deformations of the human tongue caused by its instinctive squirm are subject to certain physical and temporal constraints. It is a formidable task to learn this activity in the original image space. However, images captured during this activity can be regarded as points in a 3D space. These points may generally be expected to lie on a low dimensional manifold embedded in the high dimensional image space. This motivates the analysis of tongue squirm in a low dimensional subspace rather than the original image space. The embedding features of the tongue squirms of a human tongue can be extracted and visualized by manifold learning technologies. The instinctive squirms of different subjects can be visualized in the 3D subspace and are clustered in different areas of the subspace. Different tongue squirm data sets from different individuals have their own distribution in 3D subspace. If liveness detection fails, the recognition module 102 rejects (17) the user and their identity cannot be verified.

A liveness detection method is performed (13) based on detecting and processing the instinctive squirm of tongue. For liveness detection, a series of images of the tongue of the person is required to detect whether the person is alive. An involuntary squirm of the tongue to detect whether the person is alive is determined by capturing the images from a front view of the tongue protruding from the mouth and naturally spread. An active retractile action of the tongue is detected to determine whether the person is alive by capturing the images of the tongue while it protrudes from the mouth. The method provides a non-invasive procedure to identify a person using the features of human tongue. The tongue squirm is used for liveness detection, and the static features and dynamic features of human tongue are used for identification.

Figure 3:
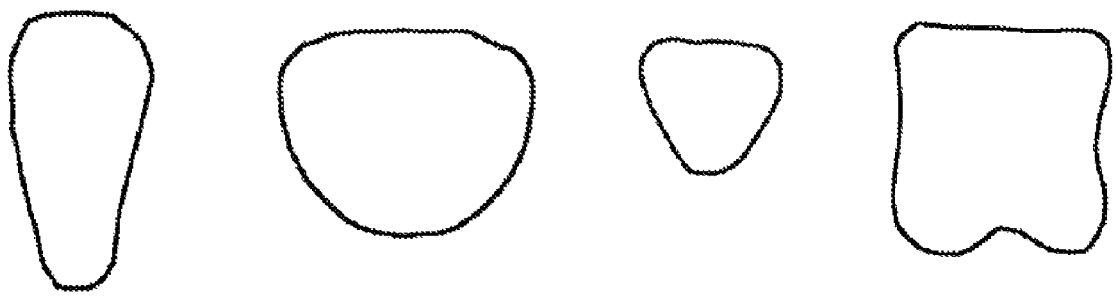
FIG. 3 is a graphical depiction of different types of human tongues having different geometric features, from a front view of the tongue to determine width and curvature of the tongue.
Figure 4:
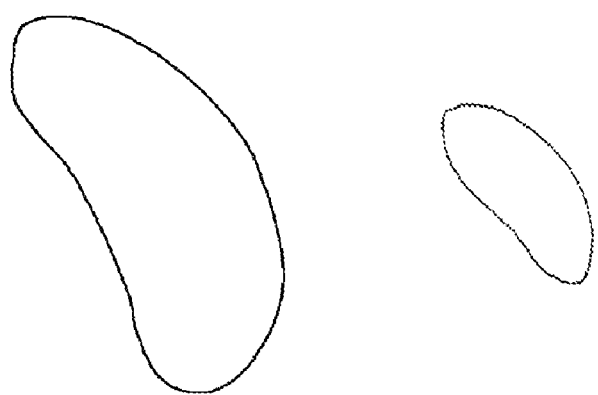
FIG. 4 is a graphical depiction of different types of human tongues having different geometric features, from a side view of the tongue to determine length and thickness of the tongue.
Figure 5:
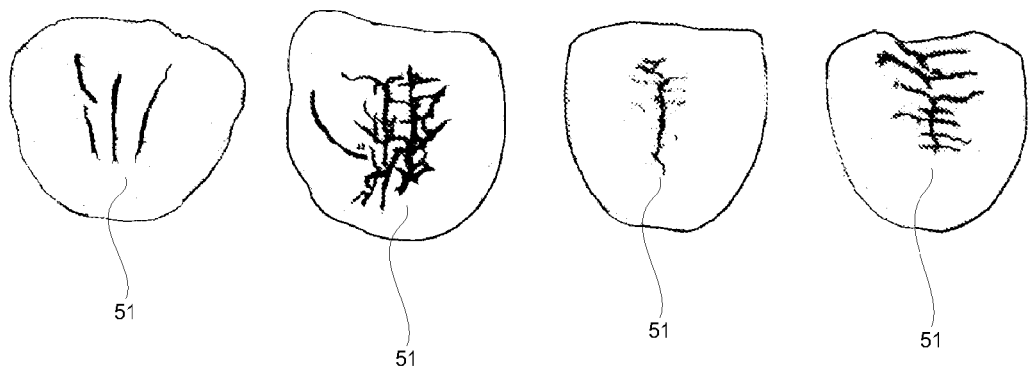
FIG. 5 is a graphical depiction of different types of human tongues having different linear features on the top surface of the tongue.

Referring to FIGS. 3 to 5, the geometric features of the tongue together with the cracks 51 and textures on its surface are distinctive to each person. The geometric features of the tongue are detected from a set of control points. The control points include corners of the mouth and tip of the tongue.

Figure 6:
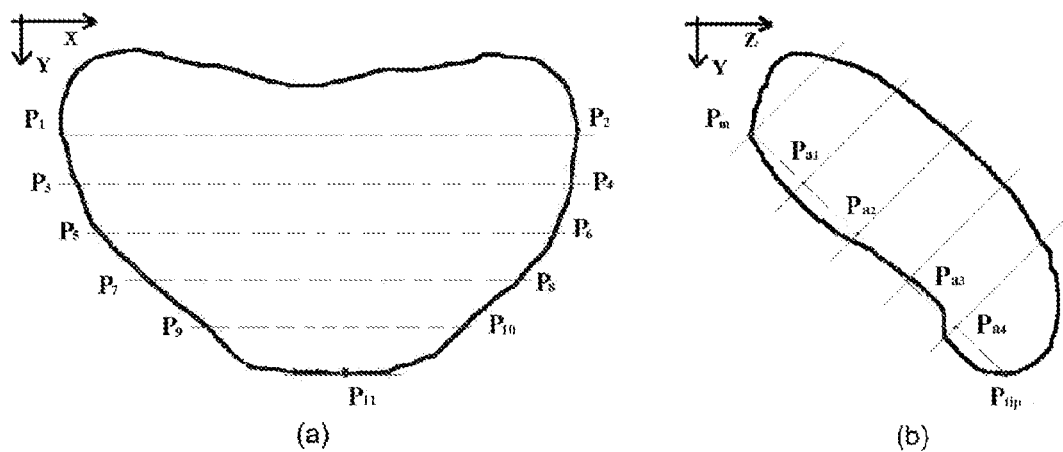
FIG. 6 is a graphical depiction of control points for obtaining the geometric features of a tongue captured by pulse image acquisition device.

The static features of the tongue are extracted (14) from the captured image and processed by the computer 103. Referring to FIG. 6, a pulse image acquisition device obtains the geometric features of the tongue by a set of control points: $P_1$, $P_2$, ... $P_{11}$, $P_{tip}$ and $P_m$. $P_1$ and $P_2$ are obtained from the location of the corners of the mouth. Using the corners of the mouth and the tip of the tongue, the part of the tongue of interest is defined as the part below segment $L_{P_1,P_2}$ in FIG. 6(a). The measurements, width of the tongue, thickness and the curvature of its tip, are formed as measurement vectors: width vector $\overline{W}$, the thickness vector $\overline{T}$ and shape of the tip of the tongue. The width vector $\overline{W}$ is constructed using the length of five segments. Four segments ($L_{P_3,P_4}$, $L_{P_5,P_6}$, $L_{P_7,P_8}$, $L_{P_9,P_{10}}$) are parallel to the segment $L_{P_1,P_2}$. These four segments are equidistant in accordance with the following formula: $d(L_{P_1,P_2}, L_{P_3,P_4})=d(L_{P_3,P_4}, L_{P_5,P_6})=d(L_{P_5,P_6}, L_{P_7,P_8})=d(L_{P_7,P_8}, L_{P_9,P_{10}})$ where $d(\square)$ represents the distance between two segments. Referring to FIG. 6(b), the thickness of the tongue is defined by taking a line between $P_{tip}$ and $P_m$. The points on $L_{P_m P_{tip}}$ with equal distance are labeled as $P_{a_1}$, $P_{a_2}$, $P_{a_3}$, $P_{a_4}$. Crossing these points, we can get the orthogonal lines of the segment $L_{P_m P_{tip}}$, whose lengths within the profile view contour are used for the thickness vector $\overline{T}$. The curvature of the tip of the tongue is evaluated: The shape of the tip of the tongue is estimated using the Total Curvature Functions (TCF). The TCF is an approximate estimation method.

Figure 6A:
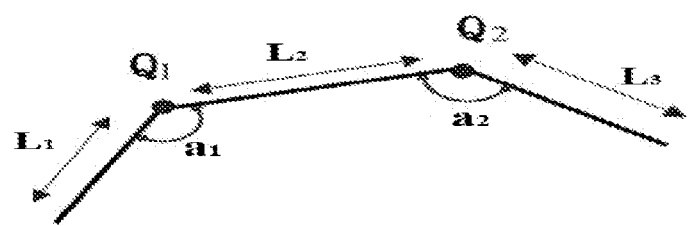
FIG. 6A is a diagram illustrating the calculation of Total Curvature Functions (TCF)

Referring to FIG. 6A, it is defined for one segment between two points $Q_1$ and $Q_2$. The curvature at $Q_1$ can be formulated as:

$$C_1 = a_1(L_1 + L_2)$$

and the curvature at $Q_2$ is formulated as:

$$C_2 = a_2(L_2 + L_3)$$

Total Curvature Measures $L_1$: length of the segment between $Q_1$ and its predecessor point; $L_2$: length of the segment between $Q_1$ and $Q_2$; $L_3$: length of the segment between $Q_2$ and its successor point; $a_1$: interior angle at $Q_1$; $a_2$: interior angle at $Q_2$.

Figure 7:
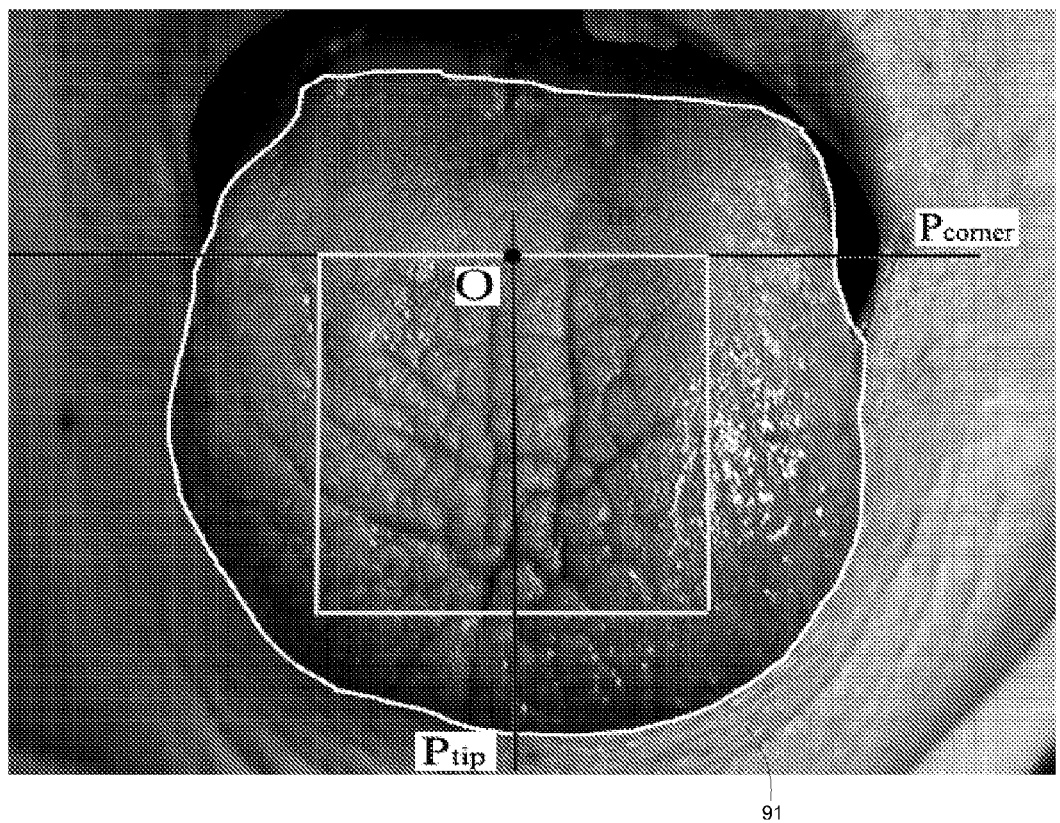
FIG. 7 is a graphical depiction of obtaining a region of interest (ROI)

Referring to FIG. 7, the crack features 51 are extracted from the captured image. A sub-image of the segmented tongue image as a region of interest (ROI) is established. This region is selected under the coordinate system $P_{corner} OP_{tip}$ and has an area of 256×256 pixels corresponding to the rectangular area enclosed by the white line 91. To extract the crack features 51, a 2D Gabor filter is applied which has the following general form:

$$G(x, y, \theta, u, \sigma) = \frac{1}{2\pi\sigma^2} \exp\left\{\frac{x^2 + y^2}{2\sigma^2}\right\} \exp\{2\pi i(ux\cos\theta + uy\sin\theta)\}.$$

An input tongue sub-image I(x,y) is convolved with G'. Then, the sample point in the filtered image can be coded to two bits, $(b_r, b_i)$ using the following rules:

$$\begin{cases} b_r = 1 & \text{if } \text{Re}[I \otimes G'] \geq 0 \\ b_r = 0 & \text{if } \text{Re}[I \otimes G'] < 0 \\ b_i = 1 & \text{if } \text{Im}[I \otimes G'] \geq 0 \\ b_i = 0 & \text{if } \text{Im}[I \otimes G'] < 0 \end{cases}.$$

Figure 8:
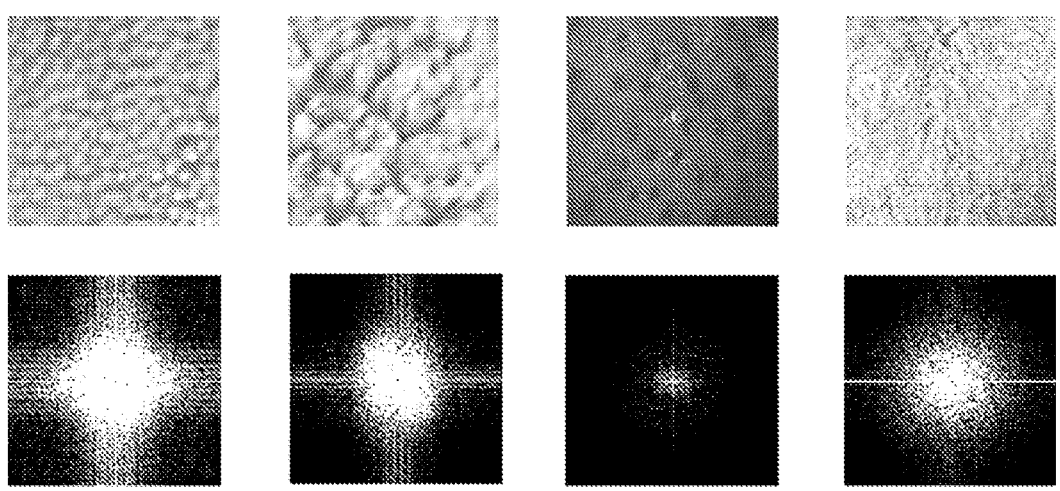
FIG. 8 is a graphical depiction of textures from different tongues and their frequency domain images.

Referring to FIG. 8, four typical textures of tongue surfaces and their correspondence frequency domain images are illustrated. These texture features are extracted from the captured image. Texture discrimination is based on frequency domain analysis. Texture feature representation describes the features in a concise and easy comparable way. The frequency domain images are represented in a polar coordinate positioning system $(r, \theta)$.

Figure 9:
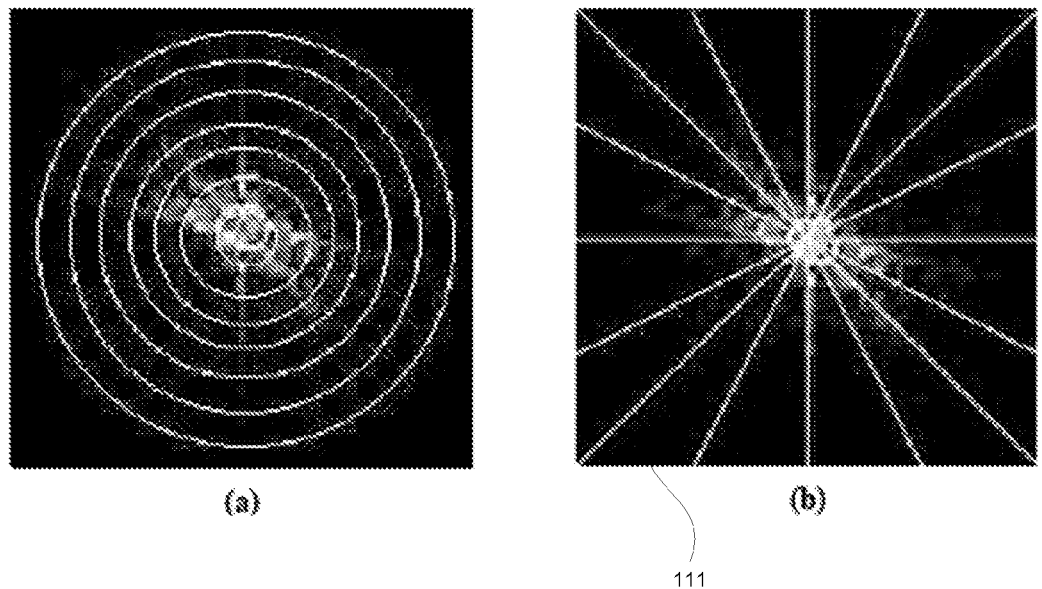
FIG. 9 is a graphical depiction of how to segment the frequency domain images for tongue texture analysis.

Referring to FIG. 9(a), the frequency domain image is divided into small parts by a series of circles which have a common center. The energy of an image is a method of representation in image analysis. The energy in each ring area $R_i$ can be defined as:

$$R_i = \sum_{\theta=0}^{\pi} \sum_{r=K(i-1)}^{Ki} I_f(r, \theta), \quad i = 1, 2, \ldots K.$$

where $I_f$ is the frequency domain images plotted under a polar coordinate positioning system, K is the number of the pixels in the rings for accumulation $R_i$ is referred to as the R features. Meanwhile, the frequency domain image can be divided into sections 111 demarcated by lines that pass through the center of the image as shown in FIG. 9(b). The energy in each section is defined as:

$$\Theta_i = \sum_{\theta=\pi(i-1)/M}^{i\pi/M} \sum_{r=0}^{L} I_f(r, \theta), \quad i = 1, 2, \ldots M,$$

where L is the length of line used for accumulation and M is the number of the section. $\Theta_i$ is referred to as $\Theta$ features. During the matching of features, the Euclidean distances between two texture feature sets represented by R features and $\Theta$ features are computed for distinguishing. U.S. patent application Ser. No. 11/608,243 filed by the applicant on 7 Dec. 2006 is herein incorporated by reference with regard to a method for distinguishing two texture feature sets.

The detected static features are compared (15) to a reference set of static features stored in the database 104 to verify the identity of the person. If there a match is found in the database, then a decision (16) is made to verify the identity of the person. If there is no match, the user is rejected (17) and the identity of the person is not verified.

Turning to FIG. 2, during enrollment, images of a tongue of a person are captured (21). The dynamic features of the tongue are extracted (22) from the captured images by the enrollment module 101. The static features of the tongue are extracted (23) from the captured images. The measurement vectors are collected from the person in order to learn the parameters for comparison and verifying the identity of people. The parameters include the mean value $\mu$ and covariance matrix $\Sigma$ of the measurement vectors. After the parameters for each tongue squirm have been learned, a probe class is determined by using a minimum distance method. The extracted static features and the dynamic features from a gallery of samples are averaged to generate the stored template and the Euclidean distance is used for discrimination. The crack features 51 from the gallery of samples are stored as templates compared with the features of the probe class directly with the minimum Hamming distance. The stored template is the recorded (24) in the database 104.

Experimental Results

Experiments were conducted and the results demonstrate that using tongue features as a biometric identifier is qualified to be a member of the biometrics family. The database for the experiments contains images collected from 174 subjects.

The subjects were required to stick out their tongue with the tongue naturally spread. The front view (see FIG. 3) and profile view (see FIG. 4) are captured simultaneously by an image capture device 105. Using the tongue as a biometric identifier was tested in both identification mode and verification mode. In the identification mode, the system 100 recognizes an individual by searching the templates of all the registered users in the database 104 for a match. Given an input feature vector $P_i$, and $P_j$ are the template registered in the database 104, the system 100 determines the identity $I_j$, where $j=\{1, 2, \ldots, N\}$. In addition, F represents the fail case where no suitable identity can be determined for the user. The procedure is formulated in the following equation.

$$P_i \in \begin{cases} I_j & \text{if } S(P_i, P_j) \geq t, \quad j = 1, 2, \ldots, N \\ F & \text{otherwise} \end{cases}$$

where $S(\bullet)$ is the matching score function of the system 100. If this highest score is greater than the system threshold, an identity is established. Based on this strategy, the system 100 conducts a one-to-many comparison to determine an individual's identity. In the verification mode, a matching algorithm conducts a one-to-one comparison to the template database 104 to determine whether the person is who he claims he is. This strategy is expressed as the following equation.

$$\text{Decision} = \begin{cases} \text{Genuine} & S(P_i, P_j) \geq t \\ \text{Imposter} & \text{otherwise} \end{cases}$$

Verification is typically used to prevent multiple people from using the same identity. The results obtained are given in False Accept Rate (FAR) and False Reject Rate (FRR).

The experiments were conducted on five types of tongue representations: geometric features, crack features 51, texture features, squirm features and the use of both static features and dynamic features.

Figure 10:
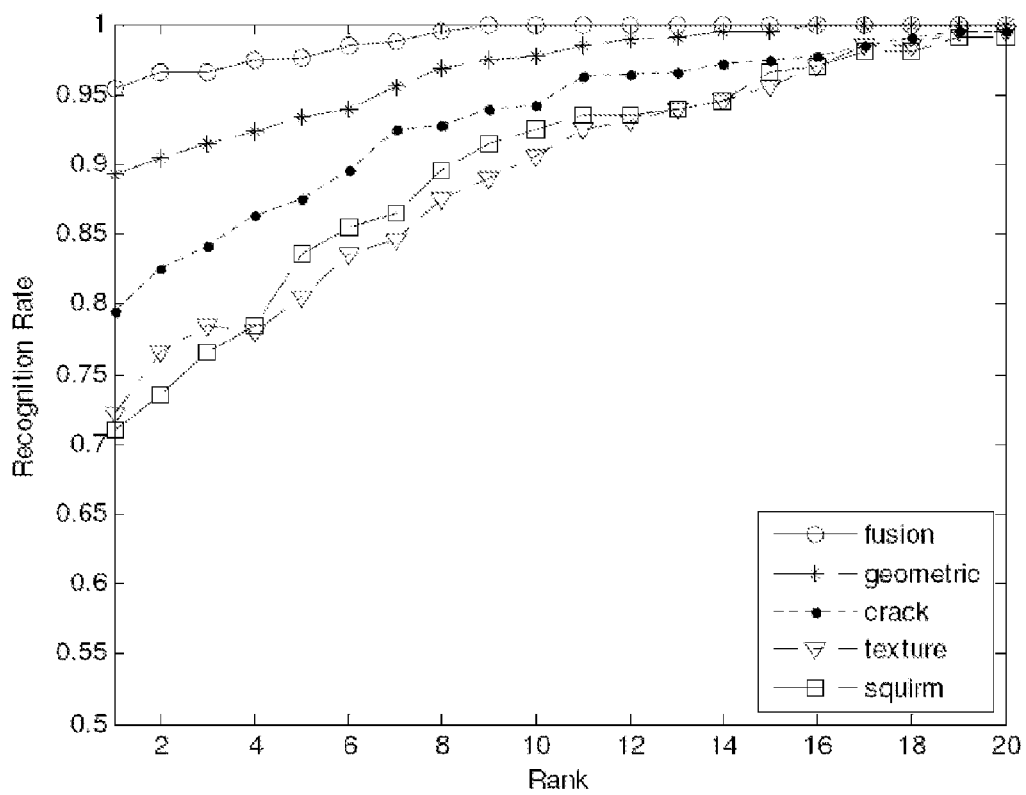
FIG. 10 is a chart illustrating the performance of the recognition rate of the present invention during identification.

The recognition performance of the identification mode is shown in FIG. 10. Each curve in FIG. 10 represents a different type of tongue representation, that is, the geometric features, the crack features 51 and the textures features. The rank one recognition rates of the fusion (static features and dynamic features) rule is 95.4%. The rank one recognition rates of the other four inputs are 89.3%, 79.4%, 72.5% and 71% respectively.

Figure 11:
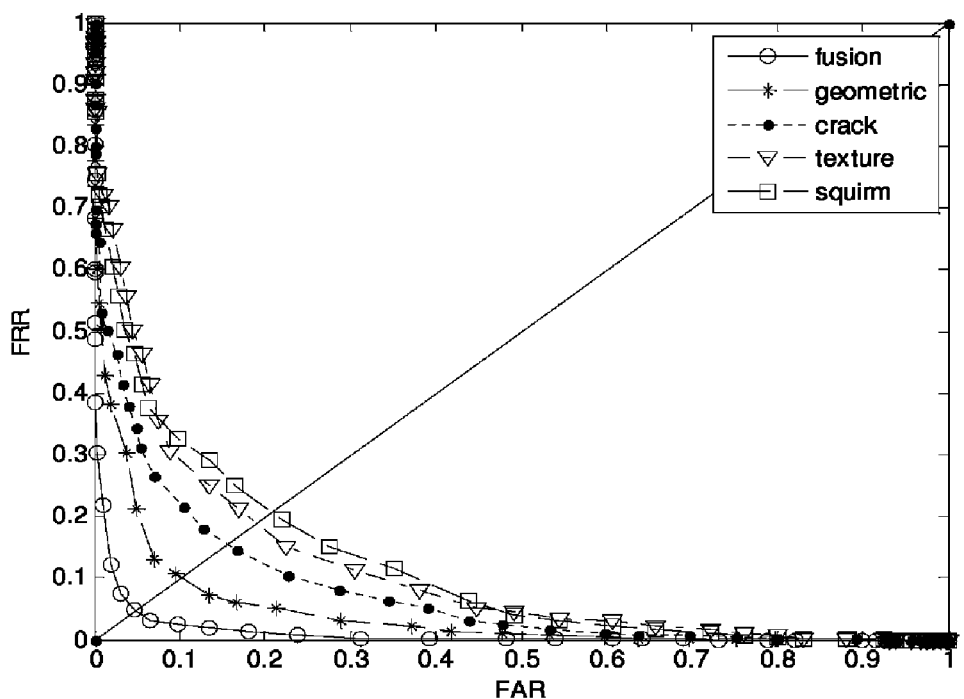
FIG. 11 is a chart illustrating the performance of the recognition rate of the present invention during verification.

The recognition performance of the verification mode is shown in FIG. 11. The Receiver Operating Characteristic (ROC) shows the False Acceptance Rate (FAR) as the X-axis and False Rejection Rate (FRR) as they-axis at each threshold value. The ROC is used for illustrating the recognition performance of the verification mode. An effective method produces the lowest possible figure but as they are actually antagonists, they must be traded off against each other. For this reason, the verification performance is quantified by using the Equal Error Rate (EER). The lowest value of EER in the present system is 4.1%, which is obtained by using both static features and dynamic features of the tongue. The EER of the other four inputs are 9.6%, 15.2%, 19.1% and 20.4%, respectively. The experimental results demonstrate that the method and system for identifying a person based on their tongue as herein described is feasible.

The method and system for identifying a person based on their tongue features may be used in various applications such as law enforcement, anti-counterfeiting with liveness detection, and other biometric modalities.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A computer implemented method for identifying a person based on their physical trait, the method comprising:
    capturing a sequence of simultaneous images of both a front view and profile view of a tongue of a person using an image capture device to obtain a plurality of static and dynamic features of the tongue;
    collecting measurement vectors from the extracted dynamic features;
    determining a mean value $\mu$ and covariance matrix $\Sigma$ of the measurement vectors;
    comparing the static and dynamic features of the captured images of the tongue to recorded details of a plurality of tongues in a database via a data processing device;
    wherein if a match is found in the database by the data processing device, the person is identified.

2. The method according to claim 1, wherein the dynamic features are obtained by comparing a series of images of the tongue of the person, and wherein the dynamic features are used to detect whether the person is alive.

3. The method according to claim 2, wherein the dynamic features comprise an involuntary squirm of the tongue and is determined by capturing the images from a front view of the tongue protruding from the mouth and naturally spread.

4. The method according to claim 2, wherein the dynamic features comprise an active retractile action of the tongue and is determined by capturing the images of the tongue while it is being protruded from the mouth.

5. The method according to claim 1, wherein the static features are obtained by processing the captured images to detect predetermined physiological. features of the tongue.

6. The method according to claim 5, wherein the recorded details of tongues in the database are a plurality of reference sets of physiological. features of tongues, and the detected physiological. features are compared the reference sets to verify the identity of the person.

7. The method according to claim 5, wherein the predetermined physiological. features of the tongue include: geometric features of the tongue, linear features on the top surface of the tongue, and texture of the top surface of the tongue.

8. The method according to claim 7, wherein the geometric features of the tongue are detected from a set of control points, the control points including corners of the mouth and tip of the tongue.

9. A computer-implemented method for recording details of tongues in a database for identifying people, the method comprising:
    extracting static features of a tongue from an image of a tongue of the person captured by an image capture device;
    extracting dynamic features of the tongue from a series of images of the tongue of the person; and
    collecting measurement vectors from the extracted dynamic features;
    determining a mean value $\mu$ and covariance matrix $\Sigma$ of the measurement vectors;
    storing the extracted features in a template in the database and associating a personal identifier therewith.

10. A system for identifying a person based on their tongue, the system comprising:
- a database to store static features of tongues of people;
- an image capture device to capture an image of a tongue of a person; and
- an enrollment module to collect measurement vectors from a person in order to learn parameters for comparison and verifying the identity of people;
- wherein the parameters include predetermined physiological features of the tongue including geometric features of the tongue, linear features on the top surface of the tongue, and texture of the top surface of the tongue, and a mean value $\mu$ and covariance matrix $\Sigma$ of the measurement vectors;
- a recognition module to extract static and dynamic features of the tongue from the captured image and to compare the captured image to recorded details of a plurality of tongue images stored in the database;
- wherein if a match is found in the database, the person is identified.

* * * * *